United States Patent
Koch

(10) Patent No.: US 8,663,351 B2
(45) Date of Patent: Mar. 4, 2014

(54) SUCTION UNIT OF A VEHICLE'S AIR CONDITIONING SYSTEM

(75) Inventor: Peter Koch, Bad Rodach (DE)

(73) Assignee: Valeo Klimasysteme GmbH, Bad Rodach (DE)

( * ) Notice: Subject to any disclaimer, the term of this patent is extended or adjusted under 35 U.S.C. 154(b) by 0 days.

(21) Appl. No.: 13/499,538

(22) PCT Filed: Oct. 1, 2010

(86) PCT No.: PCT/EP2010/064633
§ 371 (c)(1),
(2), (4) Date: Aug. 30, 2012

(87) PCT Pub. No.: WO2011/039346
PCT Pub. Date: Apr. 7, 2011

(65) Prior Publication Data
US 2012/0317937 A1    Dec. 20, 2012

(30) Foreign Application Priority Data

Oct. 1, 2009 (DE) .......................... 10 2009 048 068

(51) Int. Cl.
*B01D 50/00* (2006.01)
(52) U.S. Cl.
USPC ................................ 55/320; 55/319; 55/385.3
(58) Field of Classification Search
USPC ........................................ 55/320, 319, 385.3
See application file for complete search history.

(56) References Cited

U.S. PATENT DOCUMENTS

| 4,597,323 A | 7/1986 | Mordau et al. |
| 4,779,517 A | 10/1988 | Weller et al. |
| 8,449,637 B2 * | 5/2013 | Heinen et al. .................. 55/327 |

FOREIGN PATENT DOCUMENTS

| DE | 3330951 A1 | 3/1985 |
| DE | 19811189 C1 | 9/1999 |
| EP | 1642755 A2 | 4/2006 |

OTHER PUBLICATIONS

English language abstract and machine-assisted translation for DE 19811189 extracted from the espacenet.com database on Jul. 10, 2012, 18 pages.
English language abstract not available for DE 3330951; However, see English language equivalent US 4,597,323. Orginal document extracted from the espacenet.com database on Jul. 10, 2012, 9 pages.
International Search Report for Application No. PCT/EP2010/064633 dated Dec. 21, 2010, 4 pages.

* cited by examiner

*Primary Examiner* — Dung H Bui
(74) *Attorney, Agent, or Firm* — Howard & Howard Attorneys PLLC

(57) ABSTRACT

A suction unit of a vehicle's air conditioning system has an air flow canal (16), which features a suction opening (18) for fresh air as well as a fan housing (28), which possesses an air inlet (29) and an air outlet (31). The air outlet ending (33) of a water separation chamber (42) is directly limited by an air filter (34), which is positioned upstream from the fan housing (28).

15 Claims, 1 Drawing Sheet

SUCTION UNIT OF A VEHICLE'S AIR CONDITIONING SYSTEM

RELATED APPLICATIONS

Figure 1:
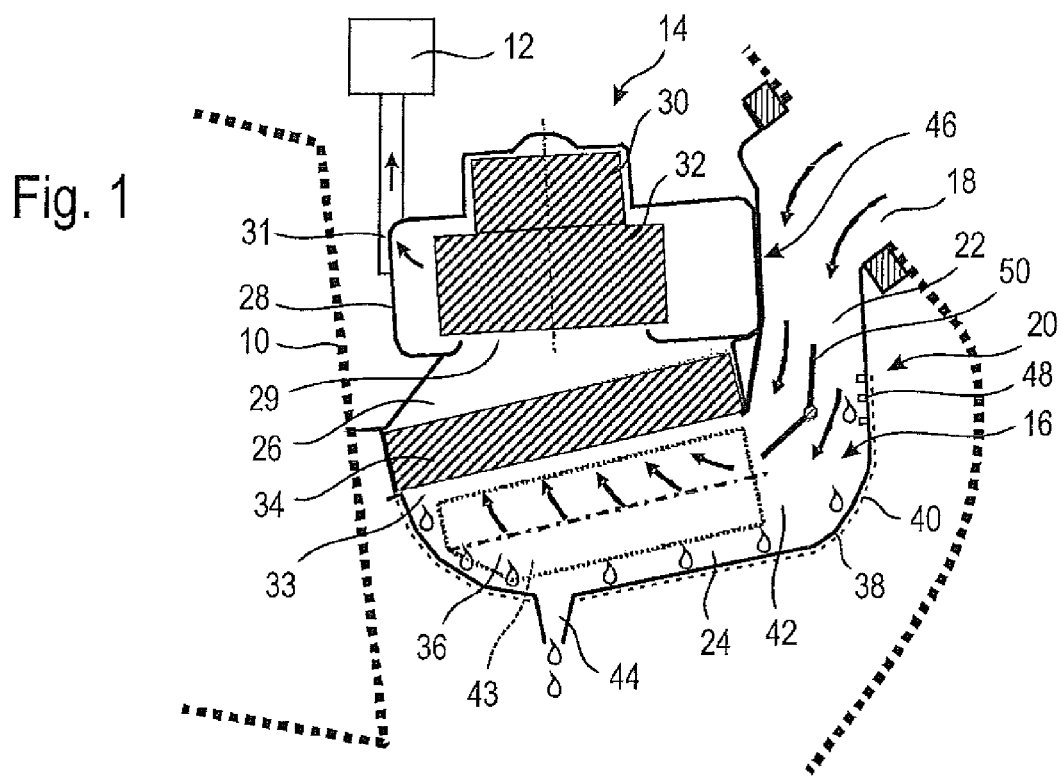

This application claims priority to and all the advantages of International Patent Application No. PCT/EP2010/06433, filed Oct. 1, 2010, which claims priority to German Patent Application No. DE 10 2009 048068.4, filed on Oct. 1, 2009.

This invention is a suction unit of a vehicle's air conditioning system. It features an air flow canal, which has a suction opening for fresh air, as well as a fan housing, which possesses an air inlet and an air outlet, whereas the air flow canal runs from the suction opening to the air inlet. It is limited by a canal wall and enfolded by a water separation chamber, in which water drops are collected that form due to the moist air flowing through the unit. This water separation chamber is limited by canal wall segments at which the condensation is collected.

The suction unit of a vehicle's air conditioning system commonly is a self-contained and partly pre-assembled unit via which the air from the environment is absorbed, filtered and then transported to the air conditioning system using a fan. However, in case of high humidity it is beneficial and desirable to reduce the humidity in order to avoid moisture from entering the fan motor.

The generic document EP 1 642 755 A1 has shown that it is vital to provide a water separation chamber for humidity reduction upstream from the fan housing. The water separation chamber consists of half of a space, which is separated by a wall running from the top to almost the bottom of the space. This forms a U-shaped canal, half of which forms the water separation chamber, in which condensation is collected. Via the other half, drier air flows towards the fan.

The purpose of the invention is to further simplify the above mentioned device without compromising its dehydrating properties.

This task is accomplished by such a suction unit by limiting an outlet ending of the water separation chamber directly through an air filter, which is positioned upstream from the fan. The inventors of this suction unit omitted the intermediate canal between the air filter and the water separation chamber, so that, in a manner of speaking, the air filter can approach the water separation chamber. Therefore, according to the invention, the result is a reduced installation space for the suction unit.

According to the preferred style, regarding the assembly condition of the suction unit in the vehicle, the filter is integrated either primarily vertically or primarily horizontally.

Another important option is the realization of a more compact version of the suction unit. This advantage of this option is that per the characterizing preamble of claim 1 the suction unit is additionally designed for the wall of the air flow canal to directly adjoin to the fan or to form to the fan in segments. This feature, of course, can be applied in combination with the aforementioned and the following in order to make for a space-saving embodiment.

The preferred means for the condensation of the waterdrops from the moist air exclusively are the outer walls that build the segments of the air flow canal.

Those canal segments, which are used for the collection of condensated water, possess a rougher surface than its vicinal surfaces of the canal wall, so that waterdrops can easily deposit to these segments.

Another option for the drops to deposit to certain segments of the canal wall is that the segments possess a rib-like pattern.

The canal wall segments for water condensation can also be furnished with a wire grid or wire meshwork. This aids the formation of waterdrops as well.

The flow canal can deflect the flow direction of the incoming environmental air between the suction opening and the air inlet by at least 90°, preferably by at least 150°, so that a "U" forms. This serves the space-saving embodiment of this suction unit.

The air flow canal should feature a suction opening for recirculating air, which, according to the assembly condition of the suction unit, should be positioned at the highest point of the air flow canal or in the vicinity of the air flow canal, which shows an air flow component directed against gravity. These embodiments prevent condensation water to enter into the attached recirculating air canal by travelling through the suction opening.

The filter itself should preferably be positioned in the upstream part, that is in the part that is positioned after the lowest point of the suction unit in regards to flow in order for as little moisture as possible to reach the air filter.

Particularly, the suction unit is completely pre-assembled and can be installed in the vehicle as is.

The water separation chamber should feature a drainage outlet for the water at its lowest point.

Other special features of this invention of a suction unit are, for example, that preferentially more than 30%, especially more than 50% of the air flow canal, which reaches from the suction opening to the air filter, should be aligned downwards as consistent with gravity. This is to ensure the certain separation of the water contained in the fresh air using gravity (and possibly centrifugal force).

While the suction unit is assembled and installed, in order to prevent any liquid from entering the fan motor, the motor should preferably be positioned level with the suction opening of the unit. This will cause a U-shape of the air flow canal in regards to the flow progression.

Furthermore it is advantageous to include an air recirculation flap upstream in the air flow canal, which will allow recirculated air to re-enter into the suction unit when open.

A second embodiment of this invention plans for the air flow canal to be U-shape with the fan housing positioned below the suction opening. In this embodiment, the filter is installed vertically and the water separation chamber forms the centre journal (vertical journal) of the horizontal U.

Figure 2:
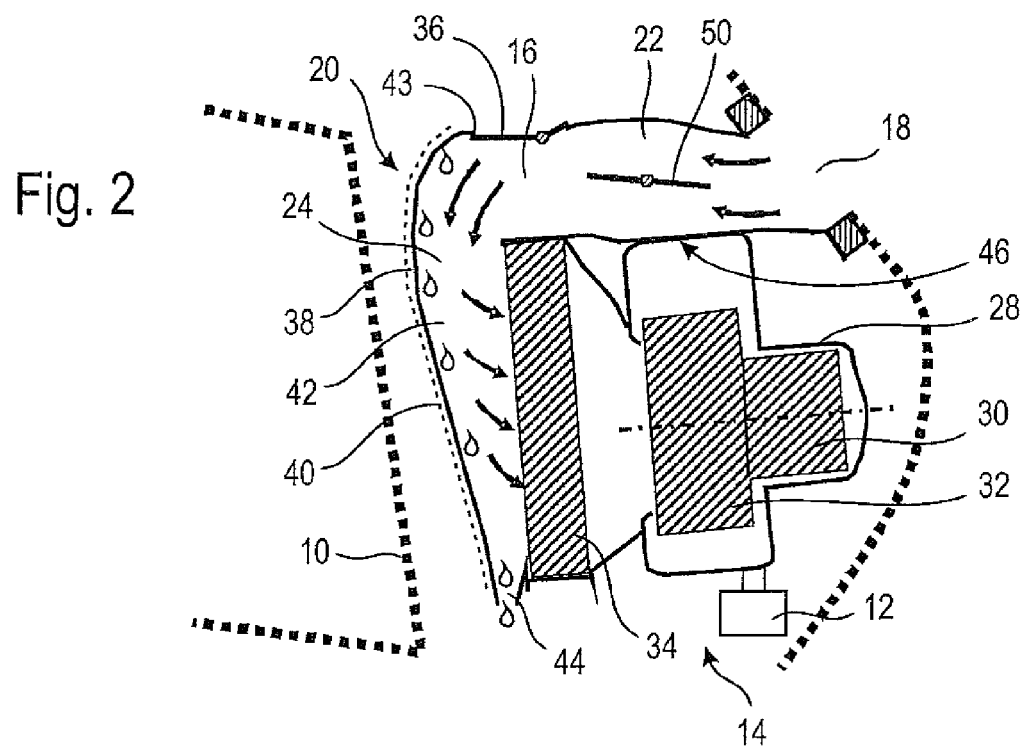

Other features and benefits of the invention result from the following description and the following drawings, which will be explained. The drawings show:

The FIG. 1 represents a cross-section view of a first embodiment of the invented suction unit when installed in the vehicle and the FIG. 2 represents a second embodiment of the invented suction unit, also when installed.

FIG. 1 shows a vehicle with noncontinuous lines, while reference numeral 10 symbolizes the so-called fire wall. The vehicle features an air conditioning system 12, also called HVAC unit, which facilitates the ventilation, heating and air conditioning of the vehicle. A so-called suction unit 14 provides the supply of fresh air inside the vehicle, which can be available completely pre-assembled.

The suction unit 14 encompasses an air flow canal 16, which features a suction opening 18 for fresh air, that is recirculated air. This air flow canal 16 is formed by the outer housing 20 of the suction unit.

In the shown embodiment, the air flow canal 16 possesses several segments, namely a first segment 22, which vertically extends downwards from the suction opening 18, a centre segment 24, which forms a horizontal segment of the air flow canal 16, as well as a rising third segment 26, which comes to an end in a fan housing 28 with an air inlet 29. The fan housing 28 contains a fan motor 30 as well as a fan wheel 32, which is powered by the fan motor. These elements draw in fresh air and transport it to the vehicle's air conditioning system 12 via an air outlet 31 (see arrows).

The air flow canal 16 is intended to have an air filter after the horizontal or centre segment 24. This air filter has the reference numeral 34. The air filter 34 is primarily aligned horizontally.

An air recirculation flap 36 is positioned upstream of the air filter 34 and makes it possible for the air circulation to reach the inside of the vehicle.

The air flow canal 16 is limited by a canal wall 38, which, for the most part, is completely formed by the outer housing 20.

The canal wall segments 40, which are limited by a non-continuous line on the outside and a continuous line on the inside, form segments, which limit the so-called water separation chamber 42. This water separation chamber 42 is, in a manner of speaking, part of the air flow canal 16, in which waterdrops from the incoming fresh air are collected by depositing at the canal wall segments 40. These canal wall segments 40 attract condensation, which then is collected at the lowest point of the air flow canal 16, which features a drainage outlet for the water.

The air filter 34 is directly positioned upstream of the water separation chamber 42, right above its air outlet 33. The air filter 34 therefore limits the water separation chamber 42 downstream.

Another special feature of the suction unit is that the canal wall 38 of the air flow canal 16 directly adjoins to the fan housing 28 or, optionally, is built through the fan housing 28 in sections in the area marked with reference numeral 46.

In order to facilitate the deposit of waterdrops, the canal wall segments 40 of the water separation chamber 42 can, for example, possess a rougher surface than the adjacent surfaces of the canal wall 38 outside of the water separation chamber 42 or even a rip-like pattern 48.

Furthermore, the canal wall segments 40 may also be furnished with a wire grid or wire meshwork on the inside.

In the displayed embodiment, the suction opening 18 is positioned at the highest point of the air flow canal 16, approximately at the level of the fan housing 28, or more precisely at the level of the motor 30.

Below the air filter 34, vertically at the lowest point of the air flow canal 16, is a suction opening 43, which can be opened and closed via the flap 36 in order to supply the inside of the vehicle with fresh air or not.

On the inside of the air flow canal 16, directly upstream of the air recirculation flap 36, is a cover flap 50 upstream from the air recirculation flap 36. This flap has to be closed when air recirculation is desired.

The embodiment shown in FIG. 2 is different from FIG. 1 due to the assembly or alignment of the air flow canal 16 and the assembly of the air filter 34 and the fan.

In order to avoid unnecessary repetitions, analogue or identical elements are marked with the already established reference numerals.

The embodiment shown in FIG. 2 features the suction opening 18 at the highest point of the suction unit 14. The first segment 22 of the air flow canal 16 primarily flows horizontally. It contains cover flap 50. After segment 22, the air flow canal 16 drops down vertically and forms the water separation chamber 42. The canal wall 38 with its canal wall segments 40 forms the wall for the condensation of the water. After the horizontal segment 22, the moist outside air will bang into this outer segment of the canal wall 38 while the air streams down, which will accelerate the drainage of the water.

A vertical air filter 34 directly limits the water separation chamber 42. The dry air flows through the air filter 34 and reaches the fan housing 28, then flows on to the air conditioning system 12, which is only depicted symbolically in this drawing.

Incidentally, in this embodiment the canal wall in area 46 is made of the fan housing 28 or directly adjoins to it.

The described suction units 14 are designed to be especially compact and they provide dependable dehydration of the incoming air by means of gravity and centrifugal force. Of course, this dehydration also works when the fresh air contains water in frozen form. In this case, snow and ice crystals supported by gravity and/or centrifugal force bang into the canal wall segments 40 of the water separation chamber 42, they melt and discharge in liquid form via the drainage outlet 44.

The invention claimed is:

1. A suction unit for an air conditioning system of a vehicle, the unit comprising:
   an air flow canal (16), which has a suction opening (18) for fresh air,
   a fan housing (28), which possesses an air inlet (29) and an air outlet (31),
   while the air flow canal (16) runs from the suction opening (18) to the air inlet (29),
   a water separation chamber (42), in which water drops are collected that form due to moist air flowing through the water separation chamber (42),
   wherein the water separation chamber (42) is limited on one side by a canal wall (38) having canal wall segments (40) at which condensation of the water drops is collected, and at the same time, open on another side opposite the one side with an air outlet (33) upstream from the fan housing (28), and an air filter (34) disposed adjacent to the air outlet (33) such that no barrier extends into the air flow between the air outlet (33) and the air filter (34).

2. A suction unit according to claim 1, wherein the air filter (34) is integrated either primarily vertically or primarily horizontally.

3. A suction unit according to claim 1, wherein the canal wall (38) of the air flow canal (16) is directly adjoined to the fan housing (28).

4. A suction unit according to claim 1, wherein outer walls build the canal wall segments (40) of the air flow canal (16) and the condensation of the water drops from the moist air is exclusively deposited at the outer walls.

5. A suction unit according to claim 1, wherein the canal wall segments (40) for the collection of the condensation possess a rougher surface than vicinal surfaces of the canal wall (38).

6. A suction unit according to claim 1, wherein the canal wall segments (40) for the collection of the condensation possess a rip-like pattern (48).

7. A suction unit according to claim 1, wherein the canal wall segments (40) for the collection of the condensation are furnished with a wire grid or wire meshwork.

8. A suction unit according to claim 1, wherein the air flow canal (16) deflects the flow direction of the fresh air between the suction opening (18) and the air inlet (29) by at least 90°.

9. A suction unit according to claim 1, wherein the air flow canal (16) comprises an air recirculating flap (36) with a sealable suction opening (43) for recirculating air, which is positioned at a highest point of the air flow canal (16) or in a vicinity of the air flow canal (16).

10. A suction unit according to claim 1, wherein the air flow canal (16), the fan housing (28), the water separation chamber (42), and the air filter (34) are completely pre-assembled.

11. A suction unit according to claim 1, further comprising a drainage outlet (44) at a lowest point of the water separation chamber (42).

12. A suction unit according to claim 1, further comprising a cover flap (50) upstream of the air filter (34) in the air flow canal (16).

13. A suction unit according to claim 1, wherein the canal wall (38) of the air flow canal (16) extends through the fan housing (28) in segments.

14. A suction unit for an air conditioning system of a vehicle comprising:
- a fan housing (28) having an air inlet (29);
- an air flow canal (16) having a suction opening (18) for fresh air, the air flow canal (16) extending from the suction opening (18) to the air inlet (29);
- a water separation chamber (42) formed in the air flow canal (16) to collect condensation of water drops that form due to moist air flowing through the water separation chamber (42);
- wherein the water separation chamber (42) is defined by a canal wall (38) having canal wall segments (40) at which the condensation is collected and is open on another side opposite the one side and forming an air outlet (33) upstream from the air inlet (29);
- an air filter (34) disposed adjacent to the air outlet (33); and
- a flap (50) disposed in the air flow canal (16) between the suction opening (18) and the air filter (34).

15. A suction unit for an air conditioning system of a vehicle comprising:
- a fan housing (28) having an air inlet (29);
- an air flow canal (16) having a suction opening (18) for fresh air, the air flow canal (16) extending from the suction opening (18) to the air inlet (29), the air flow canal (16) having a first segment (22) extending from the suction opening (18) and forming a vertical segment, a second segment (24) extending from the first segment (22) and forming a horizontal segment, and a third segment (26) extending from the second segment (24) and forming a vertical segment;
- a water separation chamber (42) formed in the air flow canal (16) to collect condensation of water drops that form due to moist air flowing through the water separation chamber (42), wherein the water separation chamber (42) is defined by a canal wall (38) having canal wall segments (40) at which the condensation is collected and by an air outlet (33); and
- an air filter (34) positioned horizontally after and above the second segment (24) and between the air outlet (33) and the air inlet (29) of the fan housing (28).

* * * * *

UNITED STATES PATENT AND TRADEMARK OFFICE
CERTIFICATE OF CORRECTION

PATENT NO. : 8,663,351 B2  
APPLICATION NO. : 13/499538  
DATED : March 4, 2014  
INVENTOR(S) : Peter Koch Page 1 of 1

It is certified that error appears in the above-identified patent and that said Letters Patent is hereby corrected as shown below:

IN THE CLAIMS:

Column 5, line 23, please insert -- on one side -- before "by a canal wall"

Signed and Sealed this  
Seventh Day of April, 2015

Michelle K. Lee  
*Director of the United States Patent and Trademark Office*